United States Patent
Menke

(10) Patent No.: US 7,717,673 B2
(45) Date of Patent: May 18, 2010

(54) REDUNDANT BLADE PITCH CONTROL SYSTEM FOR A WIND TURBINE AND METHOD FOR CONTROLLING A WIND TURBINE

(75) Inventor: Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 10/570,498

(22) PCT Filed: Sep. 3, 2003

(86) PCT No.: PCT/EP03/09773
§ 371 (c)(1),
(2), (4) Date: Mar. 8, 2007

(87) PCT Pub. No.: WO2005/021962
PCT Pub. Date: Mar. 10, 2005

(65) Prior Publication Data
US 2007/0267872 A1 Nov. 22, 2007

(51) Int. Cl.
*F03D 7/04* (2006.01)
(52) U.S. Cl. .......................... 416/1; 416/155
(58) Field of Classification Search .............. 416/1, 416/155, 159, 162; 290/44, 55
See application file for complete search history.

(56) References Cited
U.S. PATENT DOCUMENTS

| | | | |
|---|---|---|---|
| 4,348,155 A | 9/1982 | Barnes et al. | |
| 4,887,214 A * | 12/1989 | Takats et al. | 701/3 |
| 5,183,387 A * | 2/1993 | Huggett et al. | 416/147 |
| 5,966,301 A | 10/1999 | Bittorf et al. | |
| 6,783,326 B2 * | 8/2004 | Weitkamp et al. | 416/1 |
| 6,939,103 B2 * | 9/2005 | Wobben | 415/155 |
| 2003/0075929 A1 | 4/2003 | Weitkamp | |
| 2003/0116970 A1 | 6/2003 | Lutze et al. | |

FOREIGN PATENT DOCUMENTS

GB 2 071 779 A 9/1981

OTHER PUBLICATIONS

International Search Report of PCT/EP03/09773, mailed Apr. 15, 2004.

* cited by examiner

*Primary Examiner*—Ninh H Nguyen
(74) *Attorney, Agent, or Firm*—Potomac Patent Group PLLC

(57) ABSTRACT

A redundant and fail-safe blade system of a wind turbine includes at least one blade pitch drive (20, 21, 22) and at least two power control modules (60, 61, 62, 6') for controlling the blade pitch drive (20, 21, 22). The power control modules (60, 61, 62, 6') are connected to the blade pitch drive (20, 21, 22) by a switching unit (10) which allows an alternative connection between the blade pitch drive (20, 21, 22) and any of the power control modules (60, 61, 62, 6'). In operation, the blade pitch drive (20, 21, 22) is controlled by only one of the power control modules (60, 61, 62, 6'). If a malfunction of the currently operating power control module (60, 61, 62, 6') is detected, switching unit (10) provides a connection to the other power control module (60, 61, 62, 6') to allow an ongoing operation of the wind turbine without an unplanned or forced shut-down.

10 Claims, 3 Drawing Sheets

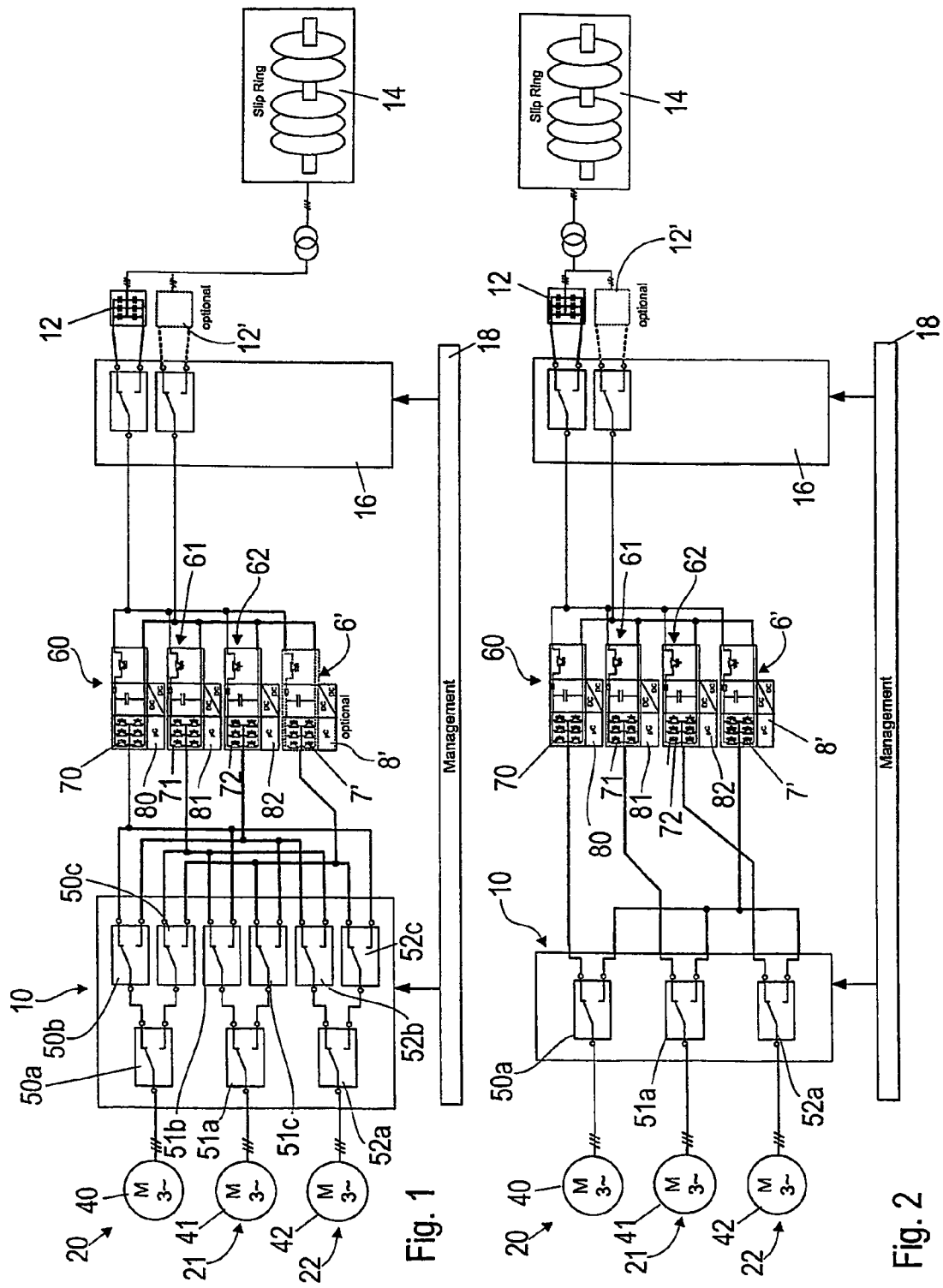

REDUNDANT BLADE PITCH CONTROL SYSTEM FOR A WIND TURBINE AND METHOD FOR CONTROLLING A WIND TURBINE

This application is the US national phase of international application PCT/EP2003/009773, filed 3 Sep. 2003, which designated the U.S., the entire content of which is hereby incorporated by reference.

FIELD OF THE INVENTION

The present invention relates generally to a wind turbine and particularly to a blade pitch system of a wind turbine.

BACKGROUND OF THE INVENTION

Wind turbines are commonly used to convert kinetic energy of an air stream into electric energy. An essential part of a wind turbine is the rotor with its rotor blades, which captures the kinetic energy and converts it into rotational energy. The efficiency of uptake of kinetic energy mainly depends on the aerodynamic profile and the pitch angle of the rotor blades. In order to adjust the pitch angle, the rotor blades, which are rotatably mounted to the rotor's hub by a pitch bearing, can be rotated around their longitudinal axis by using a pitch drive.

At very high wind speeds, the power captured from the wind by the rotor may exceed the limits set by the wind turbine's structural strength. Additionally, the generator's allowable maximum power constitutes a limit for the rotor's output power. Further, varying wind speed leads to a non-uniform rotation of the rotor and thereby creating additional non-uniform load. It is therefore a desire to constantly control power capture of the rotor and to maintain the rotor at uniform rotational speed. By far the most effective way is mechanical adjustment of the rotor blades pitch angle. In general, the rotor blades are turned with the aid of actively controlled pitch drives. Typically, each rotor blade has its own pitch drive to allow an individual adjustment of the pitch angle. Consequently, for controlling the pitch drives, a separate power control module is assigned to each pitch drive.

The set-up of a blade pitch control system outlined so far allows an instant reaction to varying wind conditions even during a gust of wind. The proper functioning of the blade pitch control system is essential for safe operation of a wind turbine. It is therefore a desire to ensure a constant and reliable control.

BRIEF DESCRIPTION OF THE INVENTION

This object is attained by a blade pitch system for a wind turbine including at least one blade pitch drive for changing a rotor-blade's pitch angle; at least two power control modules for controlling the blade pitch drive in order to adjust said rotor-blade's pitch angle; and at least one switching unit for connecting the blade pitch drive with each of the two power control modules.

In the event of a malfunction or failure of a power control module, the blade pitch drive can be disconnected from this power control module and connected to another power control module. In order to exclude any interference, the blade pitch drive is connected to either one of the at least two power control modules at the same time. Therefore, said switching unit allows an alternative connection between said blade pitch drive and each of said two power control modules.

The inventive blade pitch system can be used for active stall controlled wind turbines as well as for pitch controlled wind turbines. Active stall controlled wind turbines increase the angle of attack of the resulting air stream on the rotor blades in order to achieve an aerodynamic stall condition. This decreases the aerodynamic lift on the rotor blades and therefore decreases the power output of the wind turbine. On the other hand, a pitch controlled wind turbine reduces power capture by reducing the rotor blade's angle of attack of the resulting air stream on the blades. This reduces the aerodynamic lift too, but without creating a stall condition. However, both control methods require a control of the angle of attack, which can be achieved by turning the rotor blades or parts of it around their longitudinal axis.

The invention provides a reliable blade pitch system which allows an instant reaction to any malfunction of power control modules. In case of malfunction of a power control module the inventive blade pitch system permits different principal modes of operations.

In a first operational mode, a connection between the blade pitch drive whose power control module is failing and a spare power control module is provided by the switching unit. This mode allows an ongoing normal operation of the wind turbine without a shut-down. The malfunctioned power control module may be repaired at the next maintenance opportunity. For operating in this mode, one spare or optional power control module is required.

In contrast to this, if the pitch control system does not include a spare power control module or if the spare power control module is already in use, the wind turbine can be safely shut-down by operating the pitch control system in a second mode. In case of malfunction of a power control module, the other rotor blades of the wind turbine, whose power control modules still operate, are brought into a parking position. Within the scope of the invention, a parking position of a rotor blade is defined as a position in which the rotor blade does not capture energy from the air stream any more or in which the capture of energy is drastically reduced. The rotor blades will be placed into a parking position irrespective of whether the turbine is active stall or pitch controlled.

In a preceding step, the rotor blade whose power control module is malfunctioning is brought into a parking position as well. To this end, the malfunctioned power control module is replaced by one of the intact power control modules by switching between these two power control modules. By operating in this mode, the pitch angle of each rotor blade can be successively adjusted to a parking position in order to shut-down the wind turbine. Even if only one power control module is still operable and all the others are broken, an emergency shut-down is still possible. Although this operation mode does not allow a continuous operation of the wind turbine, damage to the wind turbine can be avoided by a reliable, fast and safe shut-down.

The aforementioned operational modes can be more generally described as a method for operating a wind turbine, the wind turbine includes at least one blade pitch drive for changing a rotor-blade's pitch angle, at least two power control modules for controlling the blade pitch drive in order to adjust the rotor-blade's pitch angle, and at least one switching unit for alternatively connecting the blade pitch drive with each of the two power control modules, the method including the steps of:

a) monitoring that power control module which is currently connected with the blade pitch drive for detecting a malfunction of the power control module, b) if detecting a malfunction then disconnecting the malfunctioned power control module from the blade pitch drive and connecting the blade pitch drive with the other of the two power control modules by the switching unit.

Further, the emergency shut-down mode can be described as a method for emergency shut-down for a wind turbine, the wind turbine includes at least two rotor-blades, at least two blade pitch drives for independently changing the pitch angle of the two rotor-blades, at least two power control modules for controlling the two blade pitch drives in order to adjust the pitch angles, and at least one switching unit for alternatively connecting any of the two power control modules with any of the two blade pitch drives, the method including the steps of:

a) monitoring the two power control modules for detecting a malfunction of the two power control modules, b) if detecting a malfunction of one of the two power control modules then b1) adjusting the pitch angle of that rotor-blade having a functioning power control module to a parking position, b2) connecting the functioning power control module with that blade pitch drive whose power control module is malfunctioned by the switching unit, and b3) adjusting the pitch angle of the other rotor-blade to a parking position.

In a further aspect of the invention, the blade pitch system includes n blade pitch drives and at least n power control modules, where n is a natural number greater than 1, and the n power control modules are connected with the n blade pitch drives by the switching unit. Typically, n equals the number of rotor blades of the wind turbine. Again the switching unit provides a connection between any of the n power control modules and any of the n blade pitch drives. In a particular embodiment, the blade pitch system includes in addition to the n power control modules at least a further power control module, and the switching unit allows a connection of the further power control module with each of the n blade pitch drives. The further power control module is typically the spare or optional power control module.

For controlling the switching unit and monitoring the power control modules the blade pitch control system may include a management unit.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIGS. 1 and 2 show embodiments including blade pitch drives with a 3-phase AC motor;

DETAILED DESCRIPTION

Figure 3:
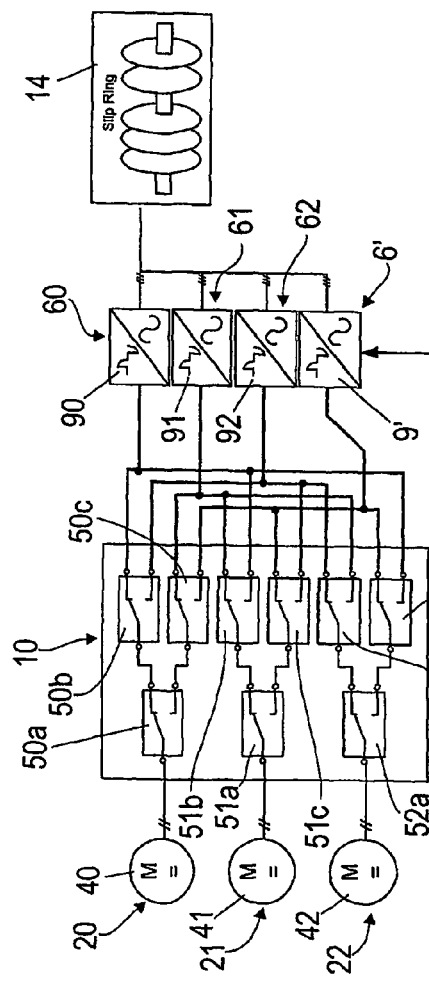
FIGS. 3 and 4 show embodiments including blade pitch drives with a DC motor.

Reference will now be made in detail to various embodiments of the invention, one or more examples of which are illustrated in the drawings. In the Figures and the description that follows, like reference numerals refer to similar elements. Each example is provided by way of explanation of the invention, and is not meant as a limitation of the invention. For example, features illustrated or described as part of one embodiment can be used on or in conjunction with other embodiments to yield yet a further embodiment. It is intended that the present invention include such modifications and variations. To describe the invention in more detail, reference is taken mainly to the pitch control method due to the fact that most of the current wind turbines are operated by using this method. However, the inventive blade pitch system can be used for active stall regulation as well.

FIG. 1 shows a blade pitch system for a three rotor blade wind turbine. However, the system can be modified to any number of rotor blades. Each rotor blade is equipped with a separate blade pitch drive 20, 21, 22. Typically, a blade pitch drive includes an electric motor coupled with a drive pinion gear via a gear reducer. The gear reducer increases the torque provided by the electric motor and reduces the rotational speed. The drive pinion gear engages with a bull gear which is rigidly attached to the rotor blade. In this particular embodiment, 3-phase AC motors 40, 41, 42 are used as electric motors for each blade pitch drive. However, the inventive concept is not restricted to 3-phase AC motors or to any specific type of gear system but can be extended to any electric drive which can be used as blade pitch drive or to any other gear system which could be used.

To drive the electric motors, power control modules 60, 61, 62 are assigned to each of the electric motors 40, 41, 42. These three power control modules control the electric motors 40, 41, 42 and hence the blade pitch drives 20, 21, 22.

If such a system or even only one blade pitch drive or power control module fails, the rotor may capture too much energy from the air stream and hence rotate uncontrolled, which can jeopardize the stability of the entire wind turbine. In particular, power control modules are subjected to failure for instance by a lightning strike. If a power control module of one rotor blade malfunctions, an ongoing adjustment of the pitch angle of that rotor blade is not possible any more and this will result in a fixed pitch angle. Since the power capture depends on the pitch angle, each rotor blades experiences a different force. In the worst case, the uncontrolled rotor blade is overloaded and destabilizes the entire wind turbine.

Therefore, to improve the reliability by adding redundancy, the pitch drive may include a spare or optional power control module 6' for the event of a malfunction of any of the currently operating power control modules. The electrical connection between the three power control modules 60, 61, 62 and the electric motors 40, 41, 42 of the blade pitch drives is provided by a switching unit 10. In this particular embodiment any alternative connection between the power control modules 60, 61, 62 including the spare power control module 6' and the blade pitch drives 20, 21, 22 is possible. To eliminate the possibility of interference between the power control modules, a connection can only be established between one blade pitch drive and one power control module at a time. To this end, the switching unit 10 includes changeover switches 50*a*, 50*b*, 50*c*, 51*a*, 51*b*, 51*c*, 52*a*, 52*b*, 52*c* for each blade pitch drive. Each of the changeover switches has two inputs and only one output and can provide only an alternative connection between its two inputs and its output. The inputs of the changeover switches 50*b*, 50*c*, 51*b*, 51*c*, 52*b*, 52*c* are connected with the three power control modules 60, 61, 62, and the spare power control module 6', respectively, while the outputs of these changeover switches are connected with the inputs of the changeover switches 51*a*, 51*a*, 52*a*.

Only for simplicity, the connection between the power control modules and the blade pitch drives are indicated as a single line. However, it is known that 3-phase AC motors require 3 separate phases which are indicated in the Figures by three diagonal slashes on the connection lines. Consequently, each changeover switch includes three separate switches for each phase.

For controlling the AC motors of the blade pitch drives each power control module includes frequency converters 70, 71, 72, 7' to convert a DC current into an AC current. The power control modules may include micro controllers 80, 81, 82, 8' (as shown for instance in FIG. 3) as well to control the frequency converters. Using the frequency converters, the rotational speed and the direction of the rotation of the AC motors can be controlled to adjust the pitch angle of the rotor blades.

The DC current is provided by rectifier 12 which rectifies the AC current obtained from a power grid. Reference number 14 refers to slip rings which establish the electric connection between the rotor and the nacelle of the wind turbine. Further details of the principal set-up of a wind are described in conjunction with FIG. 5 below. At this point, it should be noted that the blade pitch system is typically housed within the hub of the rotating rotor.

The blade pitch system may include an optional or spare rectifier 12' if the rectifier 12 fails. In this case, an optional switching unit 16 provides the connection between either of the two rectifiers and the power control modules. A central management unit 18 for operating the blade pitch system controls the switching units 10, 16 and monitors the power control modules. For operating the wind turbine, for instance in the event of losing a connection to the utility or power grid, a local DC supply is connected to power control modules. The local DC supply may include accumulators and/or capacitors, in particular double-layer capacitors.

Operation of the inventive blade pitch system is described in conjunction with FIG. 1. It is assumed that the power control modules 70, 71, 72 are operating properly and that each power control module is connected to a blade pitch drive by the switching unit. For simplicity, power control module 70 shall be connected to blade pitch drive 20, power control module 71 to blade pitch drive 21, and power control module 72 to blade pitch drive 22, respectively. Power control modules are monitored by the management unit 18 to detect any malfunction. If one of the three operating power control modules fails, for instance by lightning strike, the management unit decides how to handle this event. Since the pitch angle of the rotor blades should be adjustable at any time for safety reasons, the wind turbine must either be shut-down or the malfunctioned power control module must be replaced by a fully functional power control module.

In the event the power control module fails or malfunctions in any way, it is disconnected from its assigned blade pitch drive and that blade pitch drive will be connected to the spare power control module 6' by switching unit 10. For this operational mode, which provides the best flexibility, the blade pitch system includes a spare power control module. The replacement of the failed power control module by the spare power control module 6' allows continuing operation of the wind turbine. No emergency shut-down is required. This allows a reduction of the cost of ownership and reduces the down time. The failed power control module may be repaired at the next maintenance or service call. To indicate the need for maintenance, management unit 18 may transmit a report to an external service unit.

In the event the spare power control module is not present or already in use, a safe shut-down of the wind turbine remains possible. When the malfunction of the power control module 60 is detected by the management unit 18, the other functioning power control modules 61, 62 are controlled by management unit 18 to adjust the pitch angle of their assigned blade pitch drives 21, 22 to a parking (feathered) position. In a feathered position, the leading edge of a rotor blade is turned towards the direction of the wind. In a subsequent step, one of the functioning power control modules, for instance power control module 62, is connected by switching unit 10 to blade pitch drive 40 and the failed power control module 60. After connecting blade pitch drive 40 to power control module 62 the last rotor blade is brought into a parking position as well. This operational mode allows a safe and fast shut-down of the wind turbine if sufficient operating power control modules are no longer available. Even in a very unlikely case that only one power control module is still fully functional, a save and reliable shut-down is still possible. Thereto, the last fully functional power control module is successively connected by switching unit 10 with each blade pitch drive to bring all rotor blades into a parking position successively.

A yet further operational mode can be implemented in systems where the number of blade pitch drives and power control modules is the same. Each blade pitch drive is connected to at least one further power control module which, in normal mode of operation, already controls another blade pitch drive. Thus, a power control module controls two blade pitch drives at the same time and is hence connected with two blade pitch drives by switching unit 10. The blade pitch drive whose primarily assigned power control module fails is connected to the further operable power control module of another blade pitch drive. Since the power control modules control the electric power consumed by the blade pitch systems, it is advantageous for this operational mode that the power control modules are adequately dimensioned to avoid overloading if two blade pitch drives are assigned to one power control module.

An alternative embodiment including 3 phase AC motors is shown in FIG. 2. The principal set-up resembles that of FIG. 1 with the exception that switching unit 10 allows an alternative connection between a blade pitch drive and either the assigned power control module or the spare power control module. The spare power control module 6' is here mandatory. If a power control module fails it will be replaced by the spare power control module 6' by switching between the failed and the spare power control module thereby enabling an ongoing operation of the wind turbine. In addition to that, the management unit may transmit a message to an external service unit to report the malfunction of the power control module.

A further embodiment is described in conjunction with FIG. 3 which shows a blade pitch system including blade pitch drives with DC motors. Since the control of DC motors differs to that of AC motors, the corresponding power control modules are equipped with thyristor controllers 80, 81, 82, 8', respectively. The basic characteristic of a thyristor controller is its capability to switch between a low impedance ON and an high impedance OFF-state. This characteristic allows an easy control of the DC power applied to the DC motors. Optionally, IGBT or Power MOSFET controllers can be used instead of thyristor controllers to control the DC motors. Since the utility or power grid typically provides a 3-phase AC voltage, power control modules include rectifiers to convert AC into DC voltage. Only for simplicity, the connection between the power control modules and the blade pitch drives are indicated as single line. However, it is known that DC motors need 2 separate phases which are indicated by two diagonal slashes on the connection lines. Consequently, each changeover switch includes two separate switches for each phase. The other components principally equal the set-up already described in conjunction with FIG. 1.

Due to the similar set-up, blade pitch system of FIG. 3 enables the same operational modes as blade pitch system of FIG. 1. In case of a malfunction of one of the thyristor controllers 80, 81, 82, spare thyristor controller 8' is connected by switching unit 10 to the blade pitch drive whose power control module was failing. Alternatively, an emergency shut-down as already described in conjunction with FIG. 1 is possible if no spare power control module is provided according to the present invention.

Figure 4:
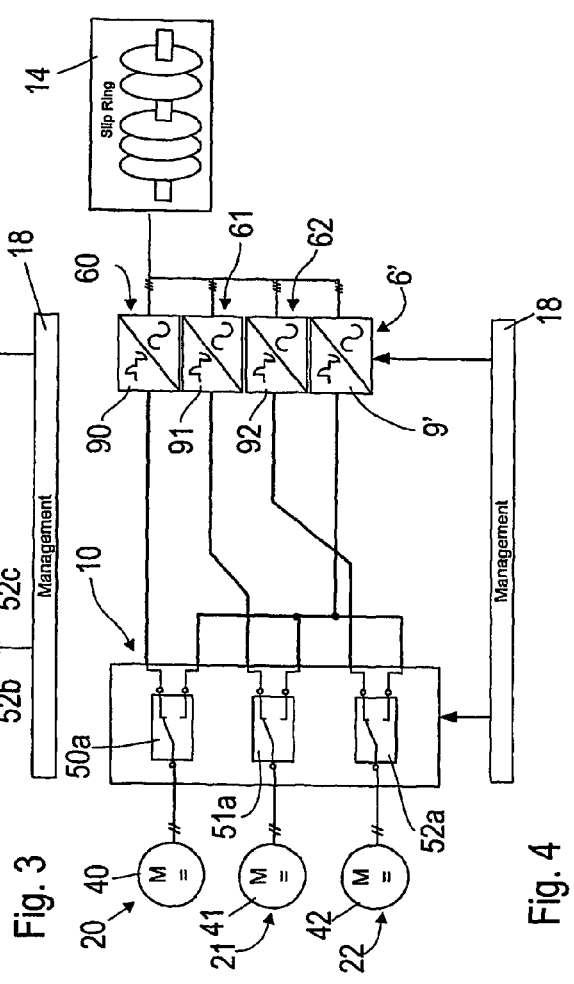

The embodiment of FIG. 4 is the equivalent to embodiment of FIG. 2 for DC motors. Again, the same operational modes as described in view of FIG. 2 are provided according to the present invention.

Figure 5:
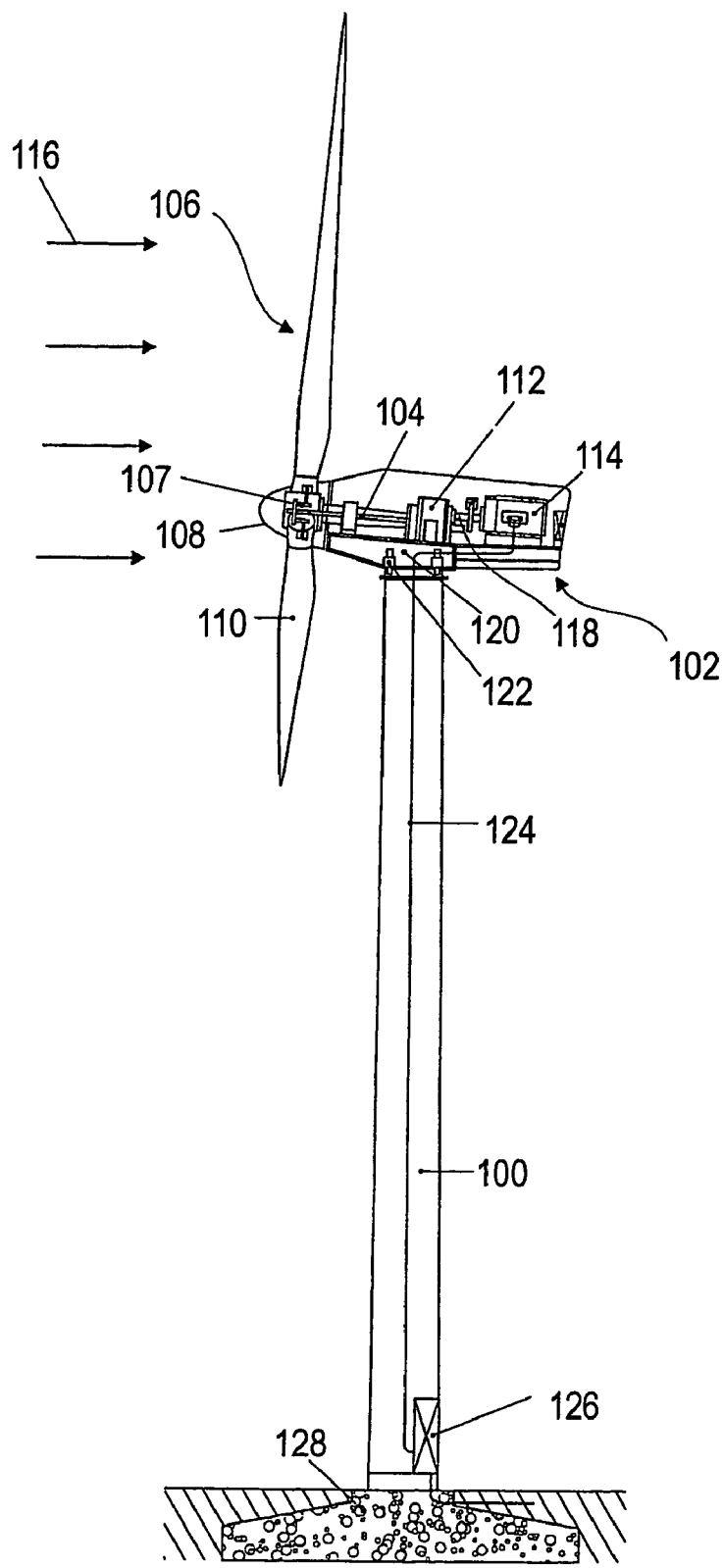
FIG. 5 shows the set-up of a wind turbine.

FIG. 5 shows a typical three rotor blade gear wind turbine, which may utilize the inventive blade pitch system according to the present invention. However, the blade pitch system can be integrated to any wind turbine with actively controlled pitch angle. The wind turbine includes a nacelle 102 mounted on a tower 100 supported by a foundation 128. The nacelle 102 houses a drive train for transmitting the rotation of a rotor 106 to a drive-shaft 118 of a generator 114. The drive train includes a rotor shaft 104 that connects the rotor 106 to a gearbox 112 in order to increase the rotation of the drive-shaft 118 of the generator 114. The drive-shaft 118 is often called the high-speed shaft and the rotor shaft 104 is known as the low-speed shaft. The rotor shaft 104 is connected to the rotor's hub 108, which generally supports three rotor blades 110. The gearbox can be optionally omitted thereby directly linking rotor 106 to generator 114. This configuration is known as a direct drive generator. The generator 114 feeds the generated electric energy into the power grid via power cables 124 with a grid connection 126 using electrical power devices such as a frequency converter and/or transformer. It is also possible that the electrical energy will be directly consumed by consumers without being fed to a public power grid.

When an incoming air stream 116 turns the rotor 106, the wind's kinetic energy is converted into rotational energy of the rotor 106 and transmitted by the drive train to the generator, which finally converts the rotational energy into electric energy.

The efficiency of a wind turbine depends on many parameters including the orientation of the nacelle, or more specifically the location of the rotor plane with respect to the direction of the air stream. This is typically controlled by a yaw drive 122 or azimuth-drive, which orients the nacelle into the wind. In modern wind turbines electrical and mechanical components form a yaw drive. More specifically, an electric high-speed drive motor is coupled by a gear reducer having a drive pinion gear engaging a bull gear. Usually the electric drive motor, the gear reducer, and the drive pinion gear are mounted on the nacelle's bedplate 120 while the bull gear is fixed to tower 100. For controlling the yaw-drive a wind-measuring sensor is used, which is capable of measuring the direction of the wind.

A similar configuration applies to a blade pitch drive 107 for adjusting the pitch angle of each of the rotor blades 106. This also dramatically affects the efficiency of the wind turbine.

For the three rotor blade wind turbine as described, the blade pitch system includes three blade pitch drives and three power control modules and may include one or more optional or spare power control modules. Typically, the power control modules are arranged within the hub near the blade pitch drives. Since a 'normal' electrical connection between the nacelle 102 and rotor 106 with power cables is not possible due to the rotation of rotor 106, slip rings 14 are used. Typically, they are axially aligned to drive shaft 104.

Having thus described the invention in detail, it should be apparent that various modifications can be made in the present invention without departing from the spirit and scope of the following claims.

LIST OF REFERENCE NUMBERS 10 switching unit
12, 12' rectifiers
14 slip rings
16 optional switching unit
18 management unit
20, 21, 22 blade pitch drives
40, 41, 42 3-phase AC motors
50a, 50b, 50c
51a, 51b, 51c
52a, 52b, 52c changeover switches
60, 61, 62, 6' power control modules
70, 71, 72, 7' frequency converters
80, 81, 82, 8' micro controllers
90, 91, 92, 9' thyristor controllers
100 tower
102 nacelle
104 rotor shaft
106 rotor
107 pitch drive
108 hub
110 rotor blades
112 gearbox
114 generator
116 airstream
118 drive-shaft of generator
120 bedplate of nacelle 102
122 yaw drive
124 power cables
126 grid connection
128 foundation

The invention claimed is:

1. Blade pitch system for a wind turbine comprising
   at least one electrical blade pitch drive (20, 21, 22) for changing a rotor-blade's pitch angle,
   at least two power control modules (60, 61, 62, 6') for controlling said blade pitch drive (20, 21, 22) in order to adjust said rotor-blade's pitch angle, and at least one switching unit (10) for connecting said blade pitch drive (20, 21, 22) with each of said two power control modules (60, 61, 62, 6').

2. Blade pitch system as claimed in claim 1, characterized in that
   said switching unit (10) allows an alternative connection between said blade pitch drive (20, 21, 22) and each of said two power control modules (60, 61, 62, 6').

3. Blade pitch system as claimed in claim 1, characterized in that
   said blade pitch system comprises n blade pitch drives (20, 21, 22) and at least n power control modules (60, 61, 62, 6'), where n is a natural number greater than 1, and
   said n power control modules (60, 61, 62, 6') are connected with said n blade pitch drives (20, 21, 22) by said switching unit (10).

4. Blade pitch system as claimed in claim 3, characterized in that
   said switching (10) unit allows a connection of any of said n power control modules (60, 61, 62, 6') with any of said n blade pitch drives (20, 21, 22).

5. Blade pitch system as claimed in claim 3, characterized in that
   said blade pitch system comprises in addition to said n power control modules at least a further power control module (6'), and said switching unit allows a connection of said further power control module (6') with each of said n blade pitch drives (20, 21, 22).

6. Blade pitch system as claimed in claim 1, characterized in that
said blade pitch system comprises at least two rectifiers (12, 12') and an optional switching unit (16) for connecting said rectifiers (12, 12') with said power control modules (60, 61, 62, 6').

7. Blade pitch system as claimed in claim 1, characterized in that
said blade pitch system further comprises a management unit (18) for controlling said switching unit and/or said optional switching unit.

8. Method for operating of a wind turbine, said wind turbine comprises
at least one electrical blade pitch drive (20, 21, 22) for changing a rotor-blade's pitch angle,
at least two power control modules (60, 61, 62, 6') for controlling said blade pitch drive (20, 21, 22) in order to adjust said rotor-blade's pitch angle, and
at least one switching unit (10) for alternatively connecting said blade pitch drive (20, 21, 22) with each of said two power control modules (60, 61, 62, 6'),
the method comprising the steps of:
a) monitoring that power control module which is currently connected with said blade pitch drive for detecting a malfunction of said power control module,
b) if detecting a malfunction then disconnecting said malfunctioned power control module from said blade pitch drive and connecting said blade pitch drive with the other of said two power control modules by said switching unit.

9. Method according to claim 8, characterized in that
said wind turbine further comprises a management unit (18) for controlling said switching unit (10) and for monitoring said power control modules (60, 61, 62, 6').

10. Method for emergency shut-down for a wind turbine, said wind turbine comprises
at least two rotor-blades,
at least two electrical blade pitch drives (20, 21, 22) for independently changing the pitch angle of said two rotor-blades,
at least two power control modules (60, 61, 62, 6') for controlling said two blade pitch drives (20, 21, 22) in order to adjust said pitch angles, and
at least one switching unit (10) for alternatively connecting any of said two power control modules (60, 61, 62, 6') with any of said two blade pitch drives (20, 21, 22),
the method comprising the steps of:
a) monitoring said two power control modules for detecting a malfunction of said two power control modules,
b) if detecting a malfunction of one of said two power control modules then
b1) adjusting the pitch angle of that rotor-blade having a functioning power control module to a parking position,
b2) connecting the functioning power control module with that blade pitch drive whose power control module is malfunctioned by said switching unit, and b3) adjusting the pitch angle of the other rotor-blade to a parking position.

* * * * *